United States Patent [19]

Chambers et al.

[11] Patent Number: 4,531,506
[45] Date of Patent: Jul. 30, 1985

[54] PORTABLE DISPOSABLE GRILLING

[76] Inventors: Carl E. Chambers; Paul A. Brogioli, both of 15M Alfred Rd., Milford, Mass. 01757

[21] Appl. No.: 604,382

[22] Filed: Apr. 27, 1984

[51] Int. Cl.³ .............................................. F24C 1/16
[52] U.S. Cl. .................................. 126/9 A; 126/25 R
[58] Field of Search ............ 126/9 R, 9 A, 9 B, 25 R, 126/25 A, 25 B, 41 R; 220/4 C, 4 D, 445, 410, 408; 206/520; 229/2.5 R

[56] References Cited

U.S. PATENT DOCUMENTS

| | | | |
|---|---|---|---|
| 3,353,527 | 11/1967 | Anderson | 126/9 A |
| 3,385,282 | 5/1968 | Lloyd | 126/9 A |
| 3,478,733 | 11/1969 | Meyerhoefer | 126/25 R |
| 3,684,087 | 8/1972 | Anderson | 126/25 R |
| 4,122,973 | 10/1978 | Ahern | 220/410 |
| 4,254,863 | 3/1981 | Katcs et al. | 126/9 A |

FOREIGN PATENT DOCUMENTS 1244865  9/1960  France .............................. 206/520

Primary Examiner—James C. Yeung
Attorney, Agent, or Firm—Charles Hieken

[57] ABSTRACT

A disposable charcoal grill has an inner tub of aluminum nested inside an outer tub of cardboard. The tubs have side walls diverging upward and outward, each having a flange about its perimeter in engagement with the other. Each has a generally vertical rib of triangular cross section midway between the ends of each long side wall. An aluminum grill rests upon the inner tub flange and the inner tub ribs. A charcoal package is seated in the lower portion of the inner tub that is coated with insulating material. Wire stays engage the charcoal package and contact the grill. A sheet of cardboard covers the grill. An outer strip of aluminum engages the flanges and the edges of the aluminum foil strip.

6 Claims, 4 Drawing Figures

PORTABLE DISPOSABLE GRILLING

The present invention relates in general to portable grilling and more particularly concerns novel apparatus and techniques for charcoal grilling with a convenient economical relatively safe portable disposable assembly that is relatively inexpensive to manufacture, relatively easy to use by unskilled persons and provides a convenient effective grill.

It is an important object of the invention to provide an improvement in portable disposable grilling.

According to the invention there is grilling apparatus comprising an outer tub, which may be made of cardboard preferably lined with aluminum foil and having a flange about its perimeter. An inner tub, preferably aluminum, nests inside the outer tub and has a flange about its perimeter that rests upon the outer tub flange to help support the inner tub with a gap between the bottom of the inner and outer tubs and preferably between a substantial portion of their side walls. The inner tub supports a prepackaged charcoal unit, such as the commercially available Royal Oak brix charcoal disposable assembly. Both tubs are preferably formed with sloping sides that diverge outward from the bottom and have a pair of opposed centered ribs in each long side wall, preferably of triangular cross section. These ribs in the inner tub help support an aluminum grill that is covered by cardboard in the package as sold. Preferably a pair of wire members clamp around the charcoal assembly and contact the grill surface at the top to help keep the charcoal assembly stationary during shipment. Wicking means allow easy ignition of the charcoal package.

Numerous other features, objects and advantages of the invention will become apparent from the following specification when read in connection with the accompanying drawing in which.

Figure 1:
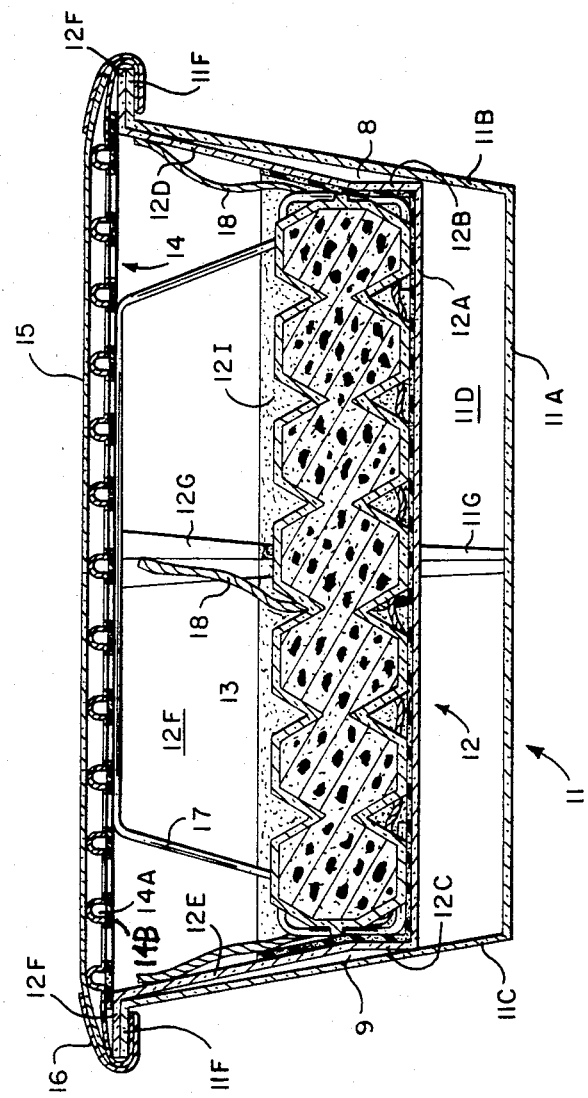
FIG. 1 is a lengthwise sectional view of an embodiment of the invention.
Figure 4:
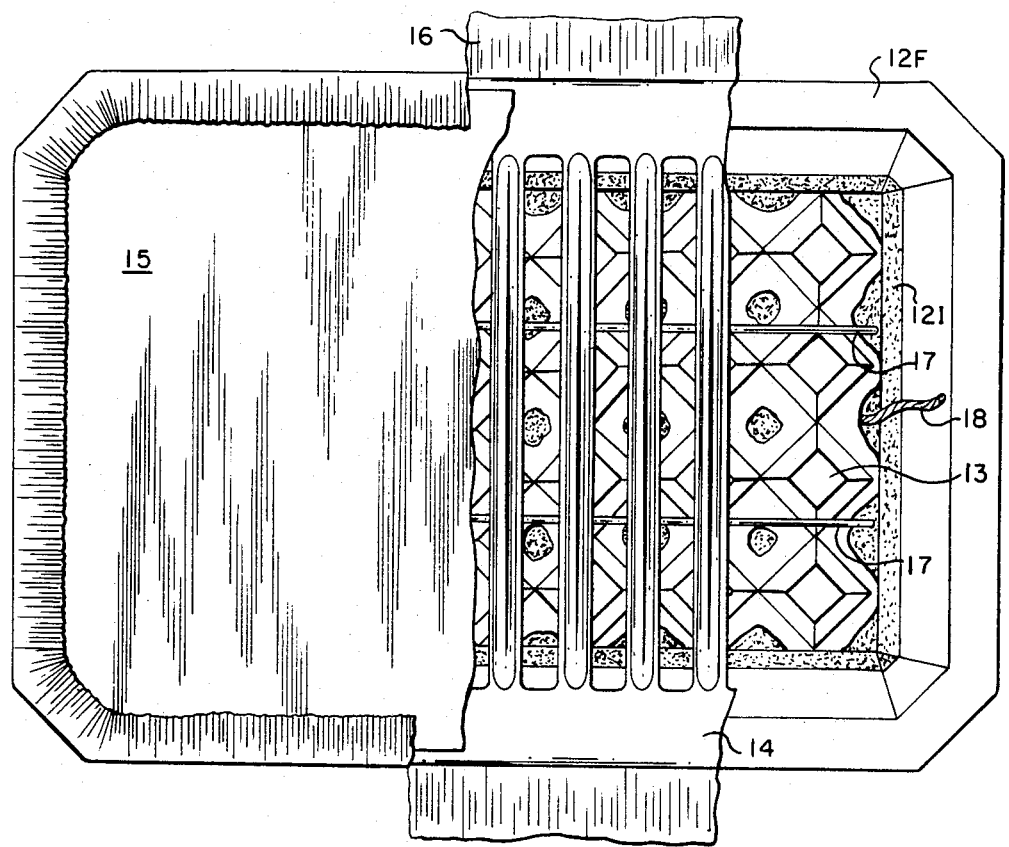
FIG. 4 is a top view of the assembled invention with a portion of the covering cardboard removed.

With reference now to the drawing and more particularly FIG. 1 thereof, there is shown a lengthwise sectional view substantially through section 1—1 of FIG. 4. The portable disposable grill includes an outer tub 11 having a bottom 11A and four upwardly sloping sides, three of which are visible in FIG. 1, 11B, 11C and 11D. Outer tub 11 includes a flange 11F around its perimeter. A rib 11G of triangular cross section extends along each long side, such as 11D, midway between sides 11B and 11C. Each long side also includes vents, such as 11V.

Figure 2:
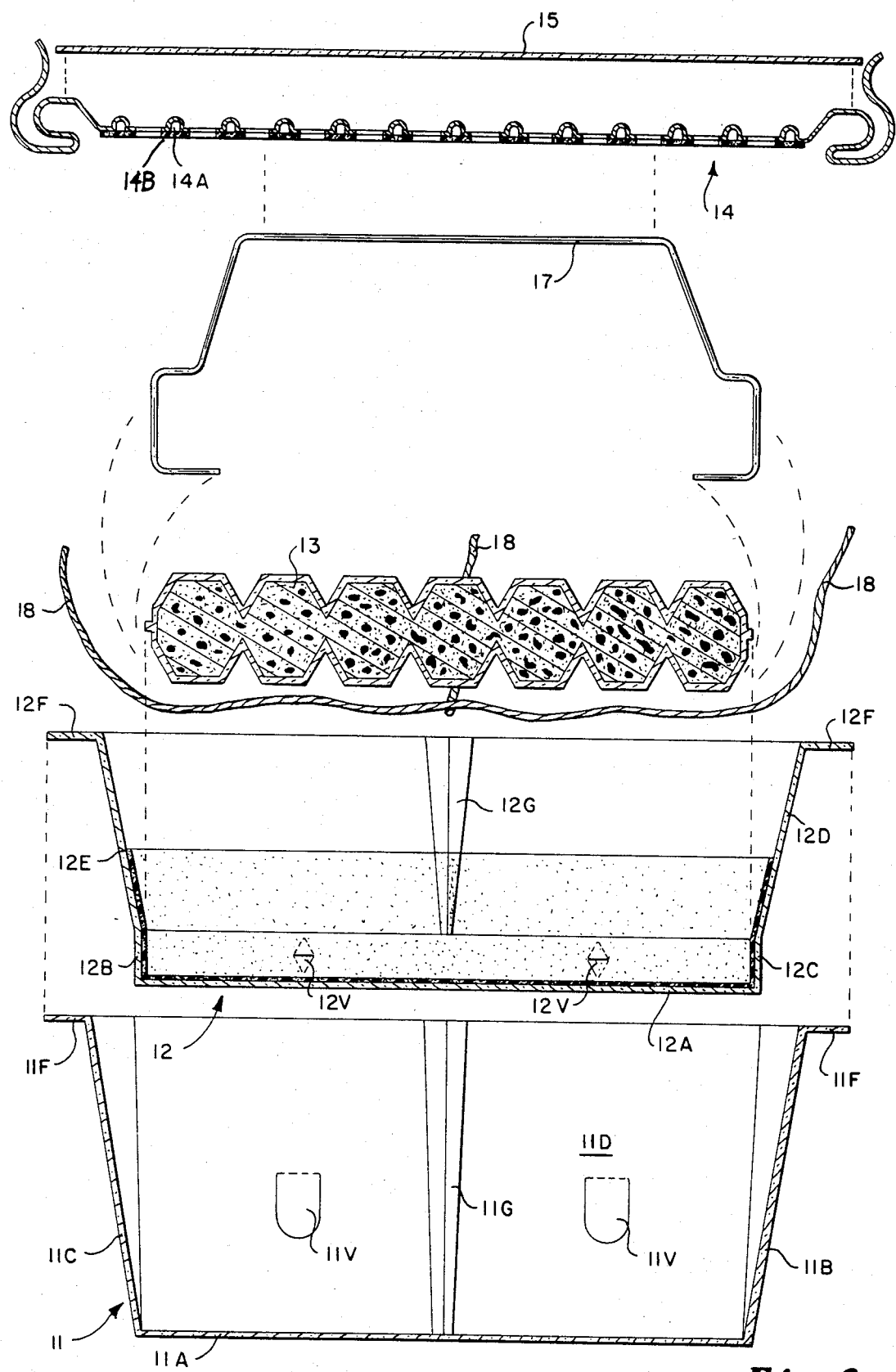
FIG. 2 is an exploded view of the sectional view shown in FIG. 1.

Inner tub 12 nests inside outer tub 11 as shown and has a bottom 12A and four short vertical sides, such as 12B and 12C that define a rectangular recess in which prepackaged disposable charcoal package 13 snugly nests and has upwardly sloping sides such as 12D, 12E and 12F that slope upward from the short vertical sides adjacent gaps such as 8 and 9 between each outer side wall of outer tub 11 and each side wall of inner tub 12. Each long sloping side wall, such as 12F, of inner tub 12 has a rib, such as 12G, which helps support grill 14 formed with ribs such as 14A and is formed with vents, such as 12V (FIG. 2). The ribs in grill 14 extend from one side to an opposed side with openings between adjacent ribs with an insulator, such as 14B, contiguously beneath each rib clear of the openings. Inner tub 12 is also formed with a flange 12F about its perimeter that helps support grill 14. A sheet of cardboard 15 covers grill 14. An edge strip 16 of aluminum foil overlaps cardboard 15 and flanges 11F and 12F. A pair of wire stays, such as 17, help support grill 14 and keep charcoal package 13 against bottom 12A during shipment. Wicks 18 may be lit to start the charcoal burning. Inner tub 12 is preferably lined with an insulating compartment 12I made of a suitable noninflammable insulating material such as Vermiculite.

Referring to FIG. 2, there is shown an exploded view of the assembly of FIG. 1. Corresponding elements are identified by the same reference symbols throughout the drawing.

Figure 3:
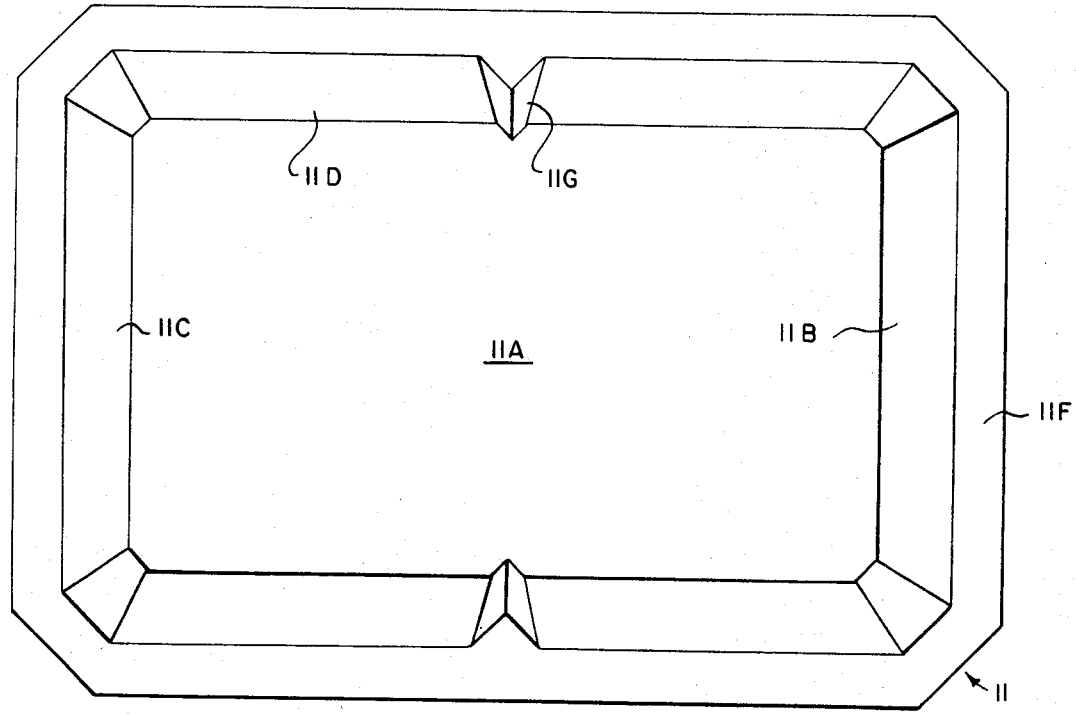
FIG. 3 is a plan view of the outside tub.

Referring to FIG. 3, there is shown a top view of outer tub 11.

Referring to FIG. 4, there is shown a top view of an assembled package according to the invention with portions of the top foils removed to illustrate the internal structure.

Unskilled personnel may readily use the invention with relative safety. The package may be carried to a well ventilated area, preferably outdoors. Thin cardboard cover 15 and foil strips 16 may be removed to expose grill 14. Wick 18 may then be ignited, typically at four points. When the charcoal has ignited sufficiently, items, such as meat or other food, may be placed on grill 14 above the hot coals and cooked as with a conventional grill. When cooking is completed, the charcoal may be extinguished by allowing it to burn out or pouring water over it. The entire assembly may then be discarded.

The invention has a number of advantages. It is compact, relatively lightweight and relatively safe and easy to use. It is relatively easy and inexpensive to manufacture and assemble.

There has been described novel apparatus and techniques for grilling with a portable disposable grill. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Grilling apparatus comprising, inner tub means for supporting burning charcoal,
   outer tub means for supporting said inner tub means,
   said inner tub means nested in said outer tub means with a significant air gap therebetween,
   aluminum grill means supported by said inner tub means for supporting items to be grilled,
   said aluminum grill means having a plurality of ribs extending from one side of said grill means to an opposed side thereof with openings between adjacent ribs,
   respective insulators contiguously beneath each of said ribs clear of said openings,
   said inner tub means and outer tub means having side walls diverging upward and outward from the bottom of each,
   said inner tub means being formed with a bottom portion having vertical sides, and a charcoal package seated in said inner tub means wherein the vertical sides of said inner tub means helps snugly accommodate the charcoal package.

2. Apparatus in accordance with claim 1 wherein said outer tub means is made of cardboard and said inner tub means is made of aluminum.

3. Apparatus in accordance with claims 1 or 2 wherein said inner tub means and said outer tub means each have a flange along their perimeter with the inner tub flange resting upon said outer tub flange and helping to support said grill means.

4. Apparatus in accordance with claims 1 or 2 wherein said inner tub is lined with insulating material around the bottom portion thereof.

5. Apparatus in accordance with claim 1 and further comprising,
- stay means between said grill means and in engagement with said charcoal package for stabilizing the latter during transport,
- and cover means covering said grill means and in overlapping relationship with said flanges for covering said apparatus.

6. Apparatus in accordance with claims 1 or 2 and further comprising venting means in said inner tub means and said outer tub means for admitting air to aid combustion of charcoal in said inner tub means.

* * * * *